United States Patent
Johnson et al.

(10) Patent No.: US 7,715,684 B2
(45) Date of Patent: May 11, 2010

(54) CABLE EXIT TROUGH WITH COVER

(75) Inventors: Wayne Johnson, Rosemount, MN (US);
Brian L. Johnson, Maple Grove, MN (US); Thomas W. Kampf, Minnetonka, MN (US); Alex Watts, Minnetonka, MN (US); Michael J. Wentworth, Belle Plaine, MN (US)

(73) Assignee: ADC Telecommunications, Inc., Eden Prarie, MN (US)

( * ) Notice: Subject to any disclaimer, the term of this patent is extended or adjusted under 35 U.S.C. 154(b) by 0 days.

(21) Appl. No.: 11/607,086

(22) Filed: Nov. 30, 2006

(65) Prior Publication Data

US 2007/0230892 A1   Oct. 4, 2007

Related U.S. Application Data

(63) Continuation of application No. 10/360,563, filed on Feb. 6, 2003, now Pat. No. 7,184,644, which is a continuation of application No. 09/680,779, filed on Oct. 6, 2000, now Pat. No. 6,535,683.

(51) Int. Cl.
*G02B 6/00* (2006.01)

(52) U.S. Cl. ........................ 385/136; 385/137

(58) Field of Classification Search ................. 385/136, 385/137
See application file for complete search history.

(56) References Cited

U.S. PATENT DOCUMENTS

| 3,403,220 | A | 9/1968 | Riedel et al. |
| 4,077,434 | A | 3/1978 | Sieckert et al. |
| D269,968 | S | 8/1983 | Rodriguez Moura |
| 4,406,379 | A | 9/1983 | Anderson et al. |
| 4,423,284 | A | 12/1983 | Kaplan |
| 4,589,449 | A | 5/1986 | Bramwell |
| 4,640,314 | A | 2/1987 | Mock |
| D293,098 | S | 12/1987 | Layton |
| 4,891,471 | A * | 1/1990 | Ono et al. ................... 174/68.3 |
| 4,942,271 | A | 7/1990 | Corsi et al. |
| 4,990,722 | A | 2/1991 | Benito Navazo |
| 5,013,112 | A | 5/1991 | Hellwig |

(Continued)

FOREIGN PATENT DOCUMENTS

DE    3335884 A1    4/1985

(Continued)

OTHER PUBLICATIONS

"Facility Network Management System," *AT&T Network Systems*, 12 pgs. (Date Unknown).

(Continued)

*Primary Examiner*—Frank G Font
*Assistant Examiner*—Jerry Blevins
(74) *Attorney, Agent, or Firm*—Merchant & Gould P.C.

(57) ABSTRACT

A cable exit trough with pivoting cover. The cover having a cover plate and a pivot plate hingedly mounted thereto for easy access to the trough. The exit trough may define an insert aperture for receiving modular cable management inserts. The modular insert providing an additional cable management device such as a curved guidewall. The cable management device may alternatively be fixed to the cable exit trough. Removable snap-mounted flanges may also be included in the exit trough.

26 Claims, 20 Drawing Sheets

U.S. PATENT DOCUMENTS

| | | | |
|---|---|---|---|
| 5,013,873 A | 5/1991 | Deibele et al. | |
| 5,067,678 A | 11/1991 | Henneberger et al. | |
| 5,134,250 A | 7/1992 | Caveney et al. | |
| 5,142,606 A | 8/1992 | Carney et al. | |
| 5,160,811 A | 11/1992 | Ritzmann | |
| 5,161,580 A | 11/1992 | Klug | |
| 5,235,136 A | 8/1993 | Santucci et al. | |
| 5,240,209 A | 8/1993 | Kutsch | |
| 5,271,585 A | 12/1993 | Zetena, Jr. | |
| 5,299,947 A | 4/1994 | Barnard | |
| 5,316,243 A | 5/1994 | Henneberger | |
| 5,316,244 A | 5/1994 | Zetena, Jr. | |
| 5,335,349 A | 8/1994 | Kutsch et al. | |
| 5,394,502 A | 2/1995 | Caron | |
| 5,399,814 A | 3/1995 | Staber et al. | |
| 5,402,515 A | 3/1995 | Vidacovich et al. | |
| 5,437,087 A | 8/1995 | Gordon | |
| 5,458,019 A * | 10/1995 | Trevino | 74/502.4 |
| 5,473,724 A | 12/1995 | Board et al. | |
| 5,503,354 A | 4/1996 | Lohf et al. | |
| 5,523,529 A | 6/1996 | Holliday | |
| 5,530,787 A | 6/1996 | Arnett | |
| 5,614,695 A | 3/1997 | Benito Navazo | |
| 5,683,211 A | 11/1997 | Gordon | |
| 5,752,781 A | 5/1998 | Haataja et al. | |
| 5,753,855 A | 5/1998 | Nicoli et al. | |
| 5,792,992 A | 8/1998 | Handler | |
| 5,792,993 A | 8/1998 | Rinderer | |
| D402,264 S | 12/1998 | Carlson, Jr. et al. | |
| 5,872,336 A | 2/1999 | Long | |
| 5,923,753 A | 7/1999 | Haataja et al. | |
| 5,937,131 A * | 8/1999 | Haataja et al. | 385/136 |
| 5,942,724 A | 8/1999 | Russo et al. | |
| 5,942,729 A | 8/1999 | Carlson, Jr. et al. | |
| 5,995,699 A | 11/1999 | Vargas et al. | |
| 6,012,683 A | 1/2000 | Howell | |
| 6,037,538 A | 3/2000 | Brooks | |
| 6,037,543 A | 3/2000 | Nicoli et al. | |
| 6,044,194 A | 3/2000 | Meyerhoefer | |
| 6,061,984 A | 5/2000 | Rose | |
| 6,076,779 A | 6/2000 | Johnson | |
| 6,084,180 A | 7/2000 | DeBartolo, Jr. et al. | |
| 6,192,181 B1 | 2/2001 | Haataja et al. | |
| 6,291,769 B1 | 9/2001 | Handler | |
| 6,316,725 B1 | 11/2001 | Cole et al. | |
| 6,318,908 B1 * | 11/2001 | Nakanishi et al. | 385/89 |
| 6,437,243 B1 | 8/2002 | VanderVelde et al. | |
| 6,448,495 B1 | 9/2002 | Mattei et al. | |
| 6,535,683 B1 | 3/2003 | Johnson et al. | |
| 6,559,378 B1 | 5/2003 | Bernard | |
| 6,668,123 B1 | 12/2003 | Ellison et al. | |
| 7,184,644 B2 | 2/2007 | Johnson et al. | |
| 2002/0050374 A1 | 5/2002 | Vander Velde | |

FOREIGN PATENT DOCUMENTS

| | | |
|---|---|---|
| DE | 37 42 448 A1 | 6/1989 |
| EP | 0 921 616 A1 | 6/1999 |
| EP | 0 957 533 A1 | 11/1999 |
| EP | 1 160 949 A2 | 12/2001 |
| FR | 2 406 327 | 5/1979 |
| GB | 408 463 | 4/1934 |

OTHER PUBLICATIONS

Brochure, "FiberGuide® Fiber Management System," *ADC Telecommunications, Inc.*, 6 pgs. (Jun. 1989).

Brochure, "Lightpaths," *Warren & Brown & Staff*, Issue 2, 11 pgs. (1995).

Brochure, "FiberGuide® Fiber Management Systems," *ADC Telecommunications. Inc.*, 33 pgs. (Oct. 1995).

Brochure, "FiberGuide™ Fiber Management Systems," *ADC Telecommunications, Inc.*, 37 pgs. (Jun. 1998).

Brochure, "ADC FiberGuide® System Express Exit™ 2×2," *ADC Telecommunications, Inc.*, 2 pgs. (May 1999).

"B-Line Wire Basket Cable Support-Catalog Download," *Cooper B-Line, Inc.*, http://www.b-line.com/product/WireBasket/wirebasketpdf.htm, 1 pg. (Nov. 16, 2000).

"New Products from EZTray; Cable Drop Out," *Cablofil, Inc.*, http://www.cablofil.com/pages/NPDropout.htm; 2 pgs. (Nov. 16, 2000).

Panduit Installation Instructions for 6×4 Spill-Over Junction and Spill-Over Duct Cover, 4 pages.

"Plenum FiberGuide® Fiber Management System," *ADC Telecommunications, Inc.*, www.adc.com, pp. 1-12, (Oct. 2000).

\* cited by examiner

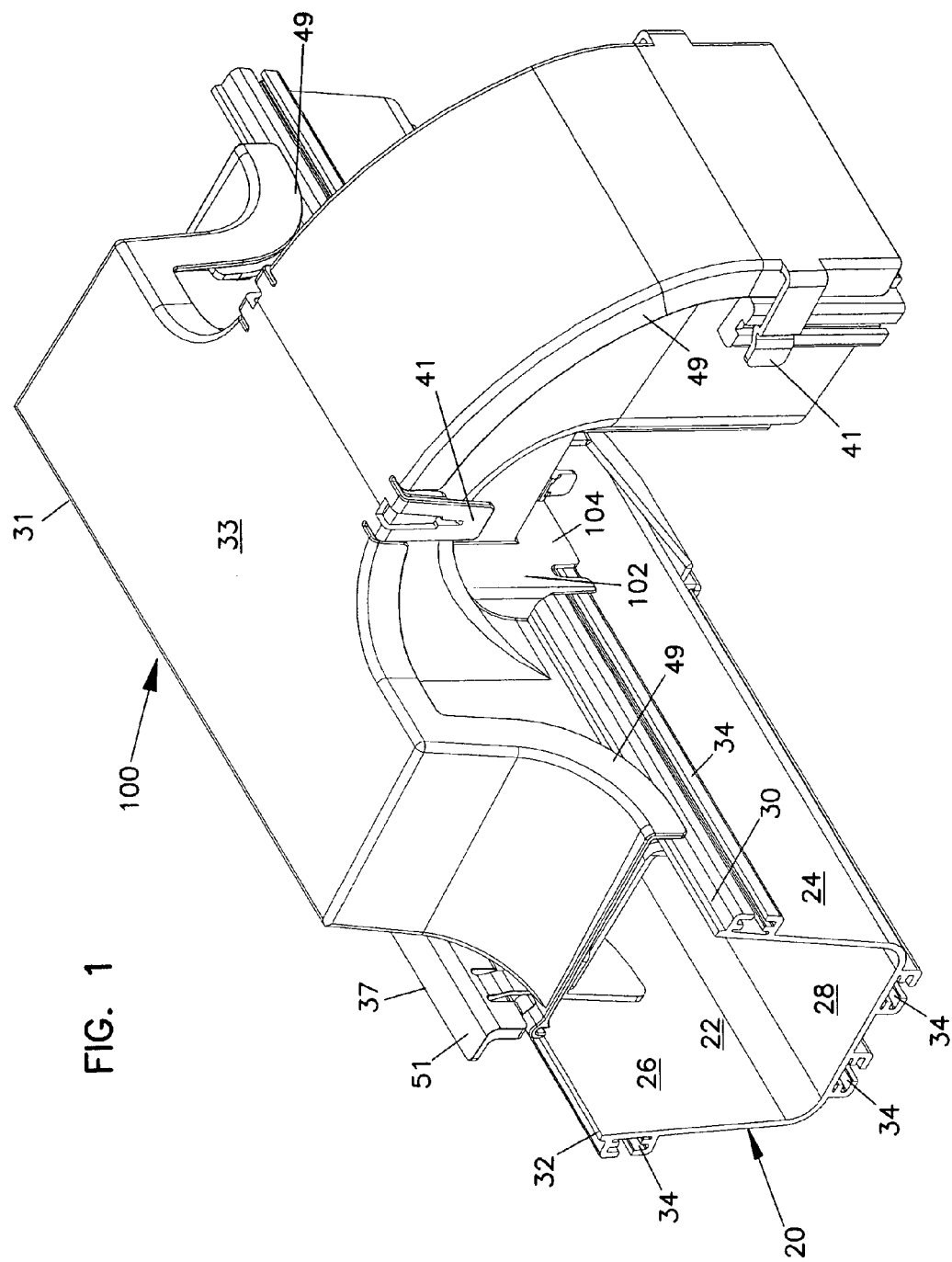

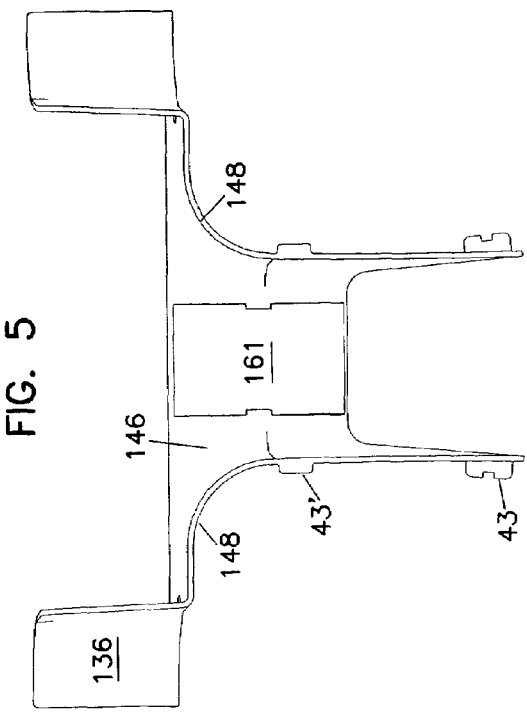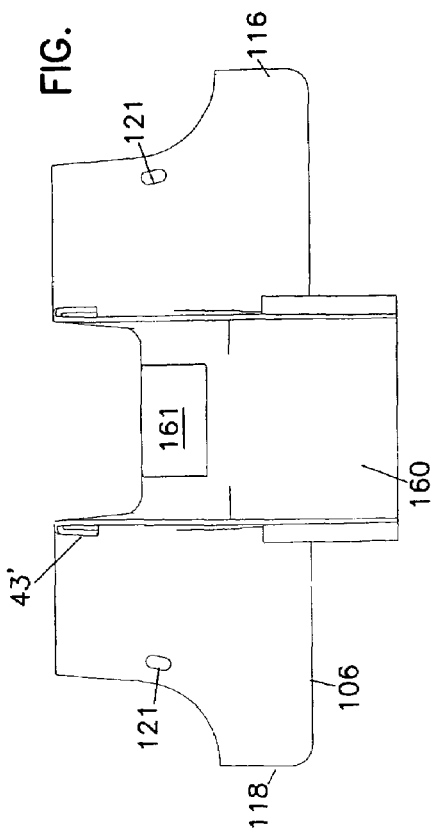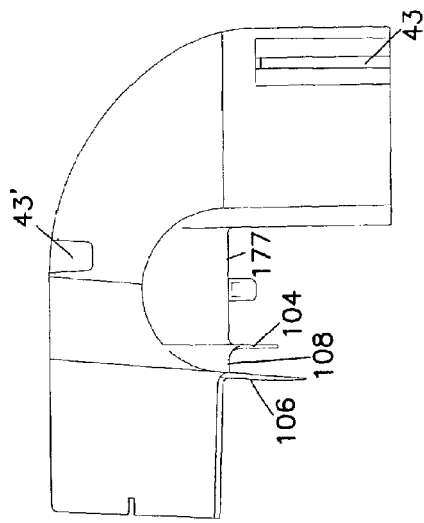

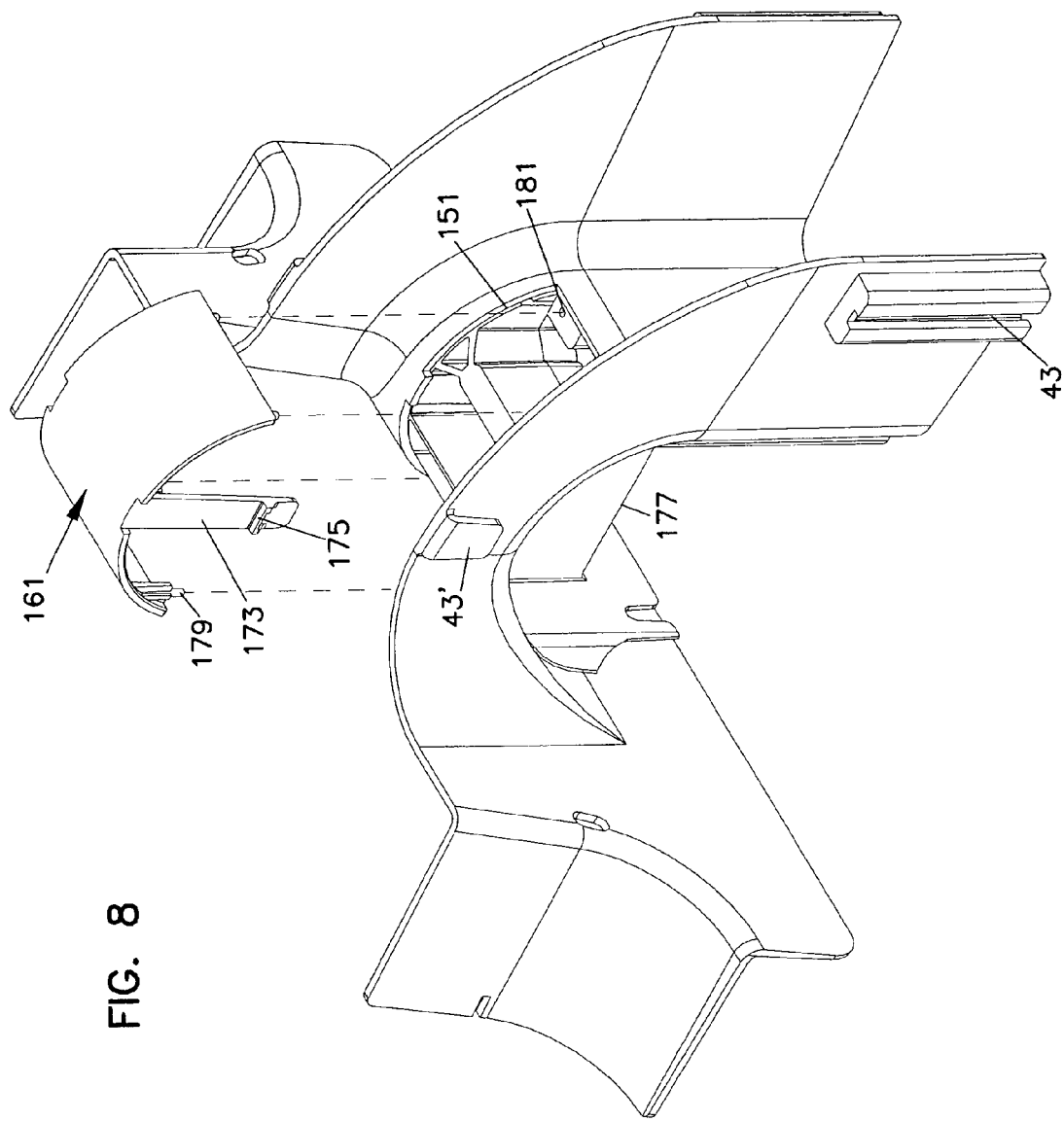

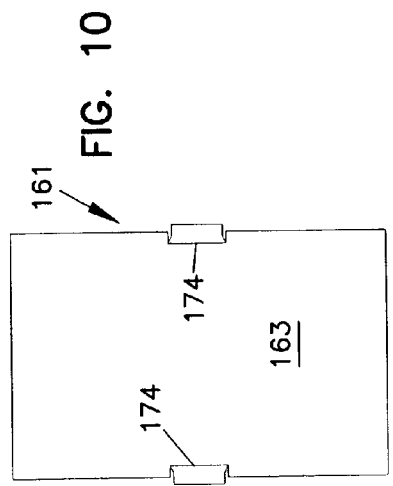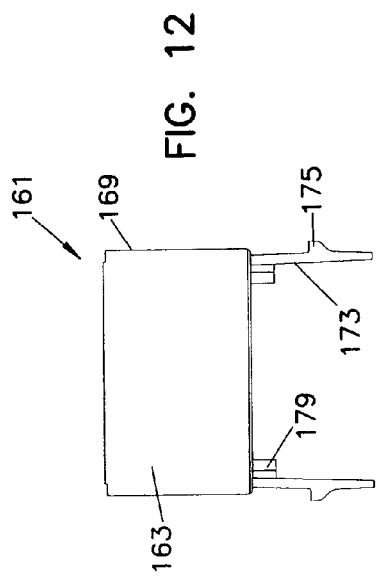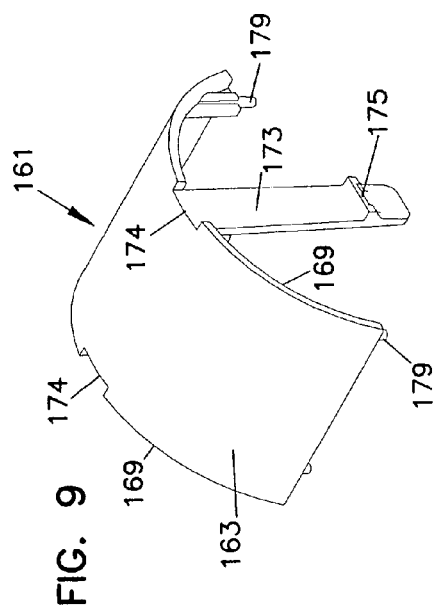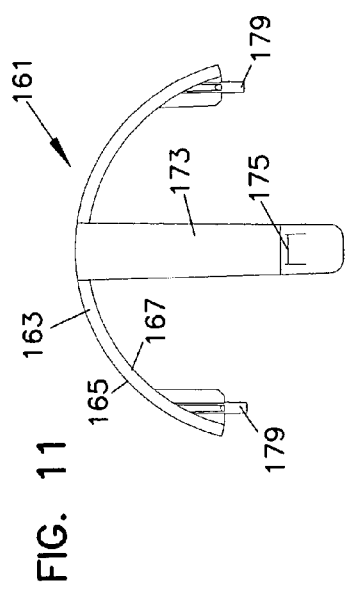

FIG. 13
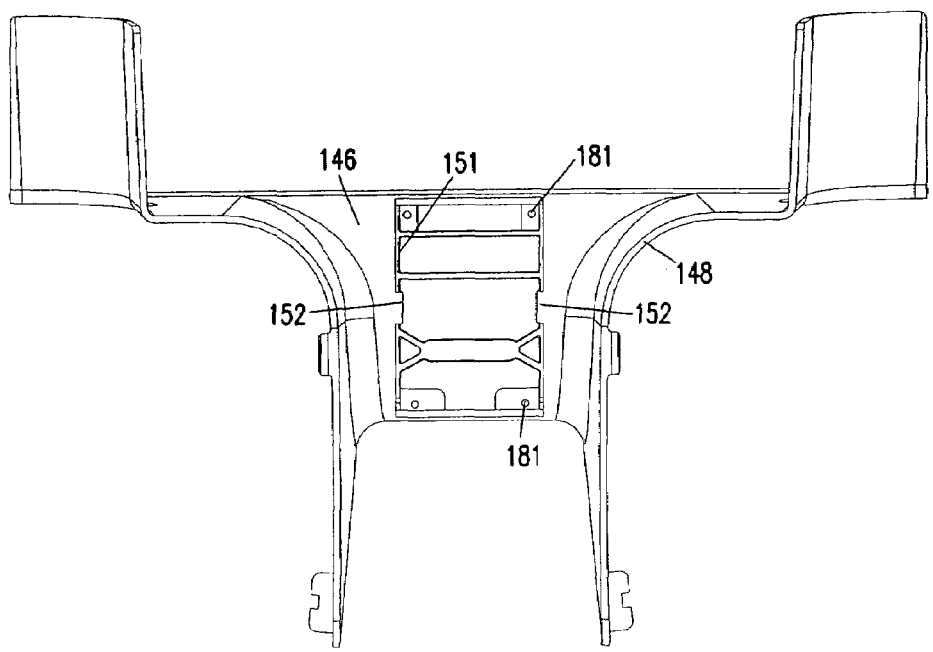
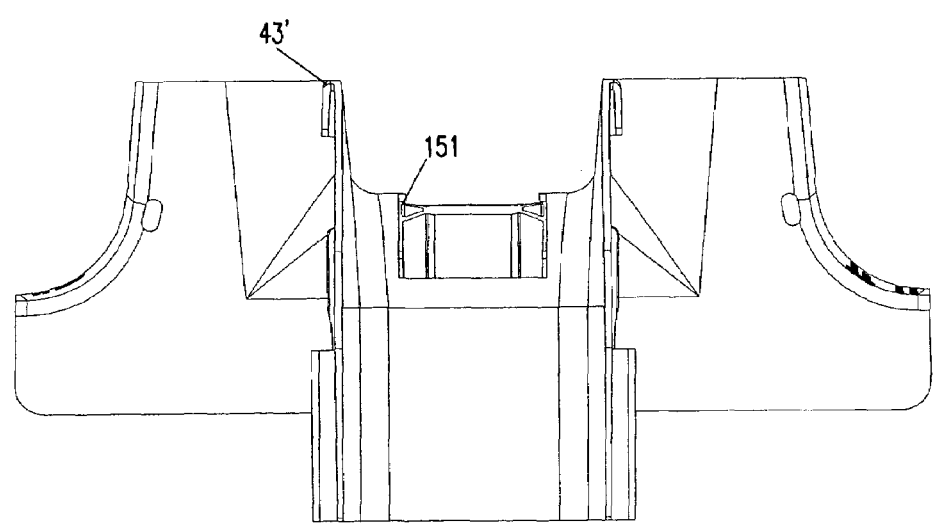
FIG. 14

FIG. 16
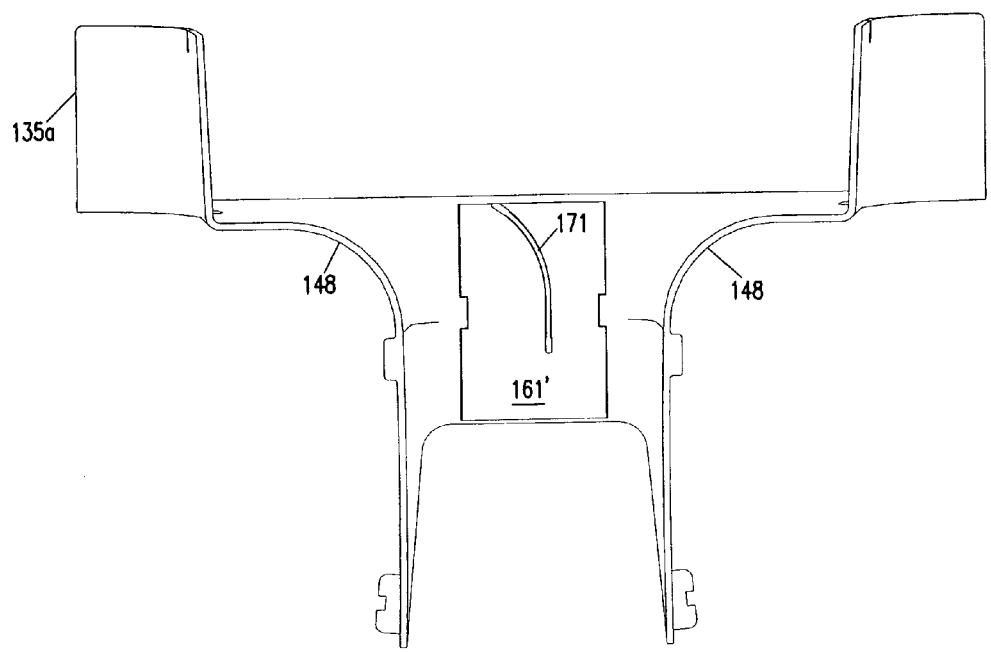
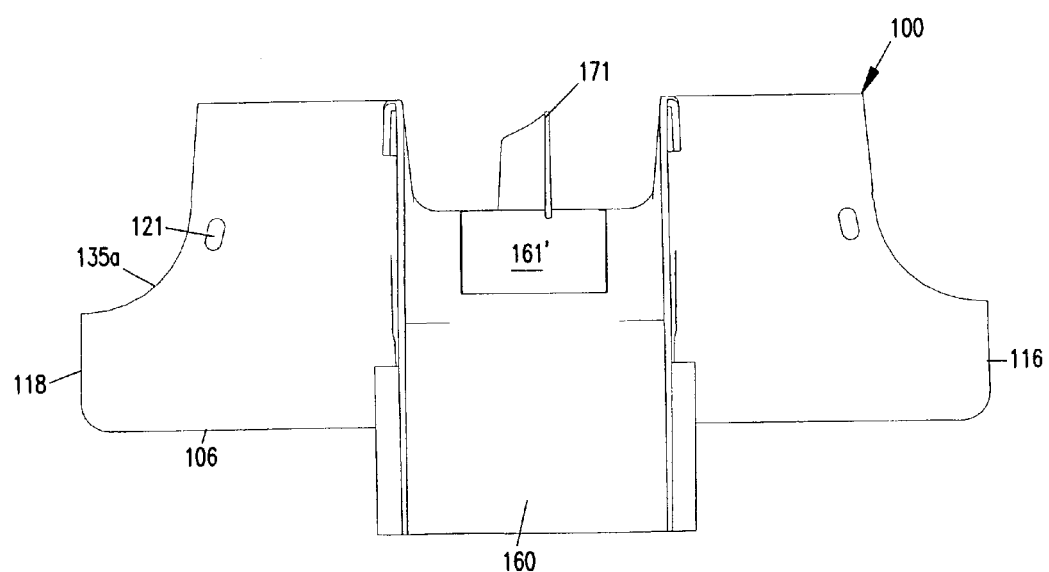
FIG. 17

FIG. 19
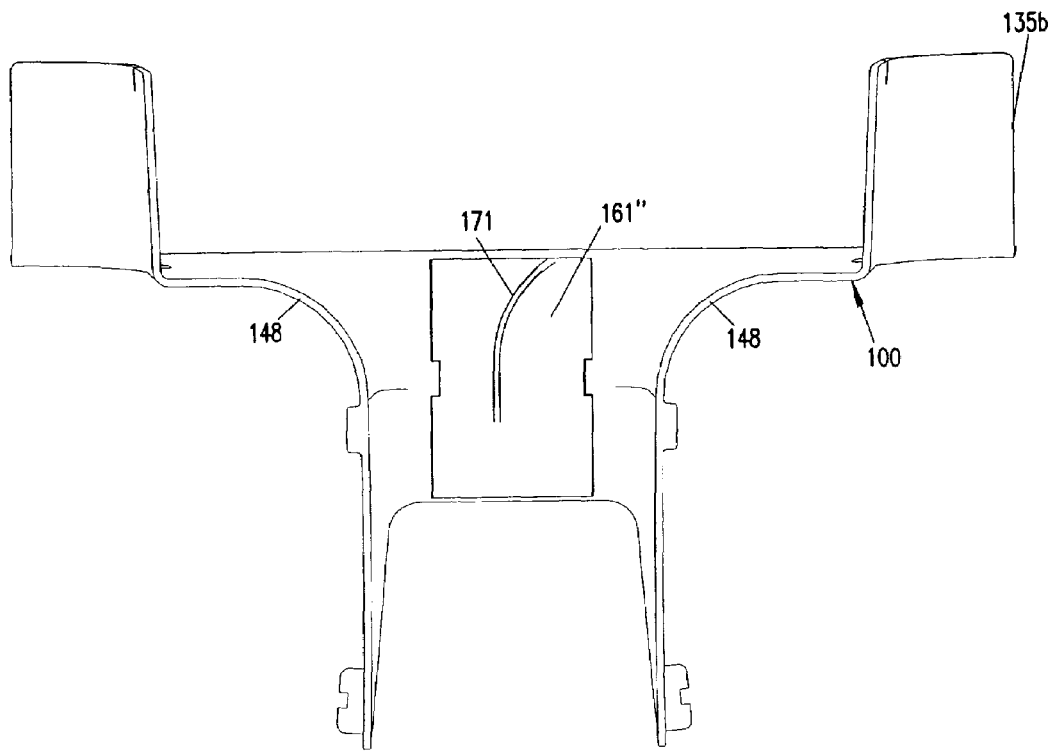
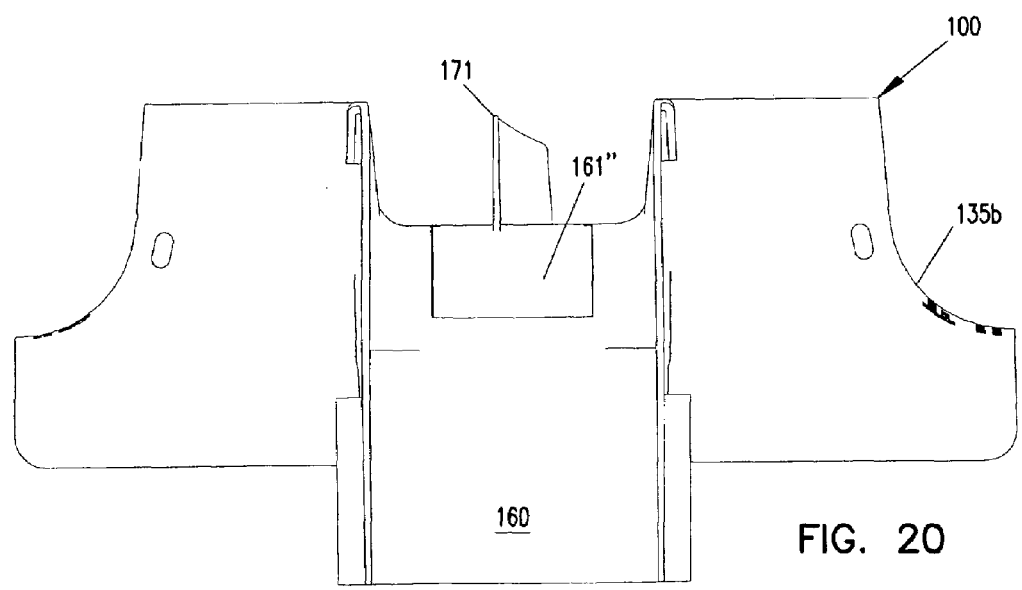
FIG. 20

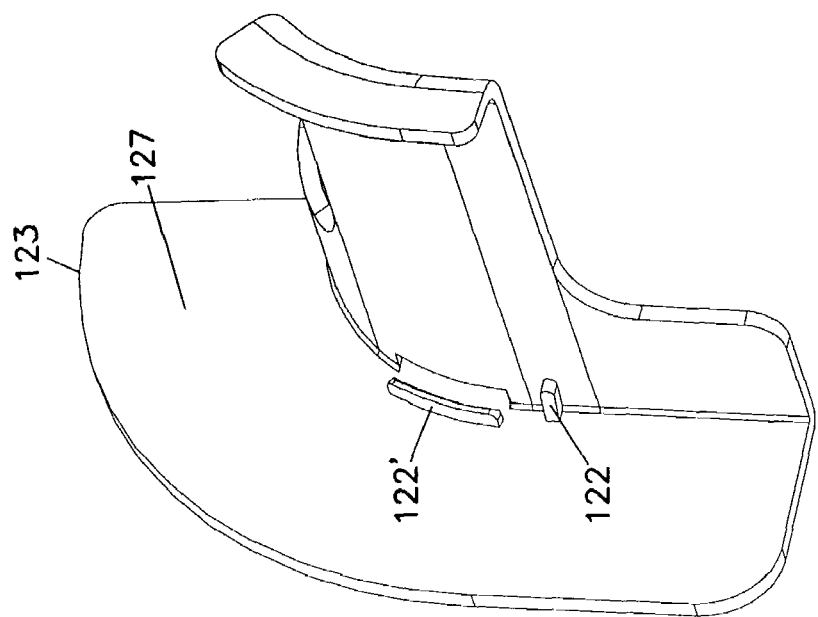
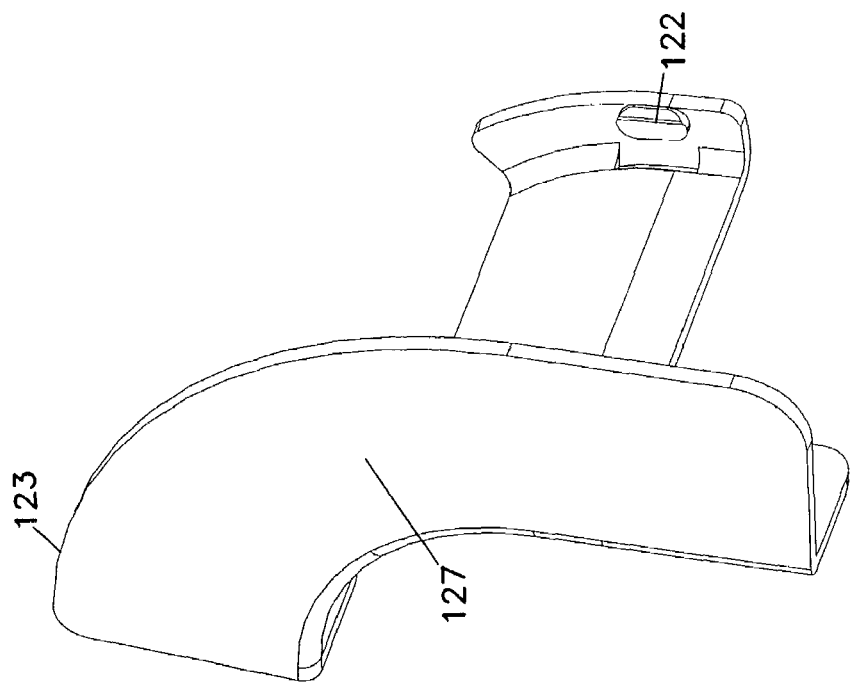

CABLE EXIT TROUGH WITH COVER

CROSS-REFERENCE TO RELATED APPLICATIONS

This application is a continuation of application Ser. No. 10/360,563, filed Feb. 6, 2003, now U.S. Pat. No. 7,184,644, which is a continuation of application Ser. No. 09/680,779, filed Oct. 6, 2000, now U.S. Pat. No. 6,535,683; which application(s) are incorporated herein by reference.

FIELD OF THE INVENTION

The invention pertains to systems for the management and routing of optical fiber cables.

BACKGROUND OF THE INVENTION

In the telecommunications industry, the use of optical fibers for signal transmission is accelerating. With the increased utilization of optical fiber systems, optical fiber cable management requires industry attention.

On area where optical fiber management is necessary is the routing of optical fibers from one piece of optical fiber equipment to another. For example, in a telecommunications facility, optical fiber cables may be routed between fiber distribution equipment and optical line terminating equipment. In buildings and other structures which carry such equipment, the cable routing can take place in concealed ceiling areas or in any other manner to route cables from one location to another.

When routing optical fibers, it is desirable that any routing system will be readily modifiable and adaptable to changes in equipment needs. Accordingly a routing system is not practical which would require a high capital outlay and which could not be readily adapted to changes in a customer's needs. Namely, if routing paths, once established, are forever fixed, the system cannot adapt. Also, and perhaps most important, any routing system must protect optical fibers from damage. In the use of optical fibers, it is recognized that the fibers should not bend beyond a minimum radius of curvature. For example, it is commonly recognized that optical fibers should not be bent in a radius of less than 1.5 inches. U.S. Pat. No. 5,937,131 discloses an optical cable exit trough addressing some of these concerns, however, there remains room for improvement.

SUMMARY OF THE INVENTION

According to preferred embodiments of the present invention, a cable routing system is disclosed for routing optical fiber cables between optical transmission equipment. The system includes a lateral trough section configured for defining a cable pathway. An exit trough is mountable to the lateral trough section to provide a cable exit pathway from the lateral trough section. The exit trough includes a bracket portion mountable to a top edge of the lateral trough section. Two curved lead-ins on opposite ends of the bracket portion each define a cable pathway leading to an exit trough portion extending from a middle of the bracket portion in a direction away from the lateral trough section. The lead-in portions are configured to receive removable flanges for improved cable management. The exit trough portion includes a convexly curved bottom trough surface, and two convexly curved upstanding sides on opposite sides of the bottom trough surface. The exit trough may be covered by an exit cover which includes a cover plate hingedly mounted to a pivot plate. The exit cover is disposed over the exit trough and the lateral trough section. The hingedly mounted pivot plate allows access to the lateral trough section without having to remove the entire cover.

The exit trough defines a cable pathway leading upwardly and away from the lateral trough section. The exit trough is mountable to the lateral trough section without modification to the lateral trough section. The exit trough can be placed generally at any location along the lateral trough section, and can be placed during initial system setup, or at a later time as the need arises for an exit pathway from the lateral trough section, such as when new optical transmission equipment is added to the system. The exit trough may include a downspout portion defining a downwardly directed cable pathway, or other directional pathway as desired. The cover allows access to the lateral trough section when adding or removing cables without having to remove the cover from the exit trough.

Differently sized pivot plates can be provided for different widths of lateral trough sections.

In one embodiment, the bottom trough surface may include an upstanding guidewall for cable management. In a further embodiment, the exit trough includes an aperture for receiving a removable insert. The removable insert includes a major surface forming a portion of the bottom trough surface of the exit trough. The removable insert may include an upstanding guidewall for improving cable management.

BRIEF DESCRIPTION OF THE DRAWINGS

FIG. 1 shows perspective view of an exit trough assembly according to the present invention mounted to a lateral trough.

FIG. 5 is a top view of the exit trough of FIG. 4.

FIG. 6 is a front view of the exit trough of FIG. 4.

FIG. 7 is a side view of the exit trough of FIG. 4.

FIG. 8 is a perspective view of an exit trough according to the present invention and showing a removed modular insert piece.

FIG. 9 is a perspective view of the modular insert shown in FIG. 8.

FIG. 10 is a top view of the modular insert of FIG. 9.

FIG. 11 is a side view of the modular insert of FIG. 9.

FIG. 12 is a front view of the modular insert of FIG. 9.

FIG. 13 is a top view of the exit trough of FIG. 8 with the insert piece removed, thereby exposing an insert aperture.

FIG. 14 is a front view of the exit trough of FIG. 13.

FIG. 16 is a top view of the exit trough of FIG. 15 with the modular insert piece placed within the exit trough according to the present invention.

FIG. 17 is a front view of the exit trough of FIG. 16.

FIG. 19 is a top view of the exit trough of FIG. 18 with the modular insert piece placed within the exit trough according to the present invention.

FIG. 20 is a front view of the exit trough of FIG. 19.

FIG. 32 is a first perspective view of a removable flange according to the present invention.

FIG. 33 is a second perspective view of the flange of FIG. 32

DETAILED DESCRIPTION OF THE PREFERRED EMBODIMENTS

Figure 1A:
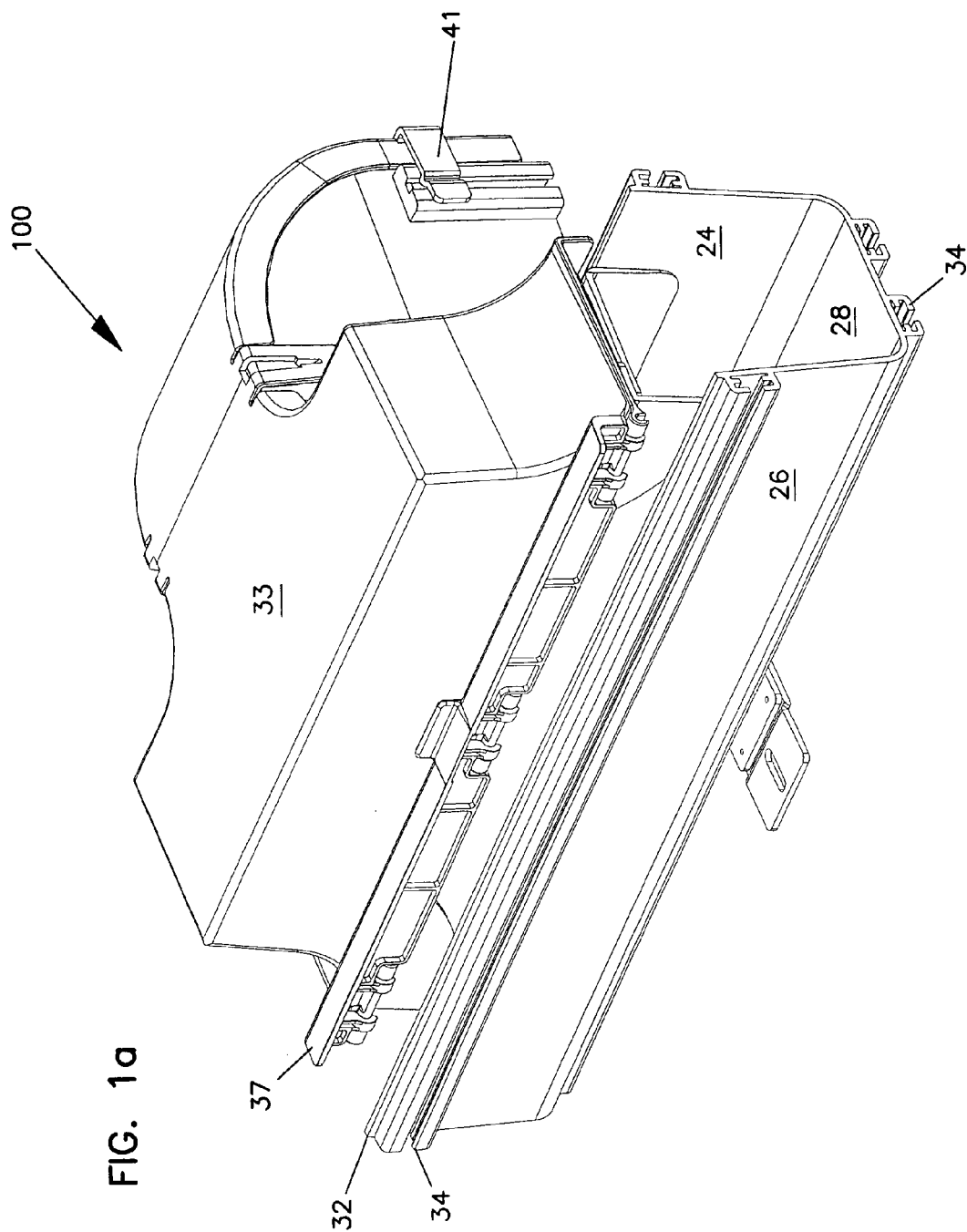
FIG. 1a is second perspective view of the exit trough assembly of FIG. 1.
Figure 1B:
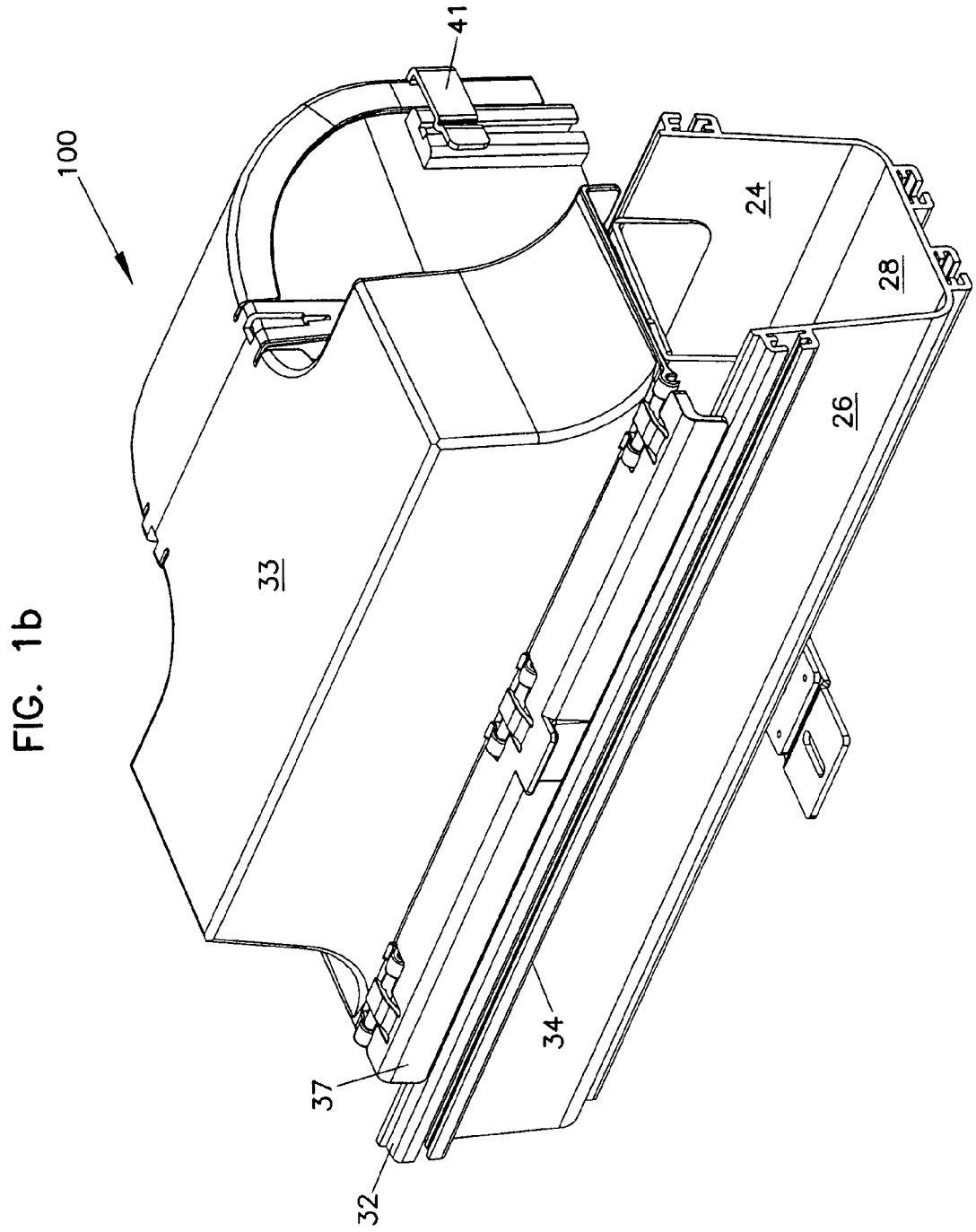
FIG. 1b is a perspective view of the exit trough assembly of FIG. 1a showing the pivot plate in a closed position.
Figure 2:
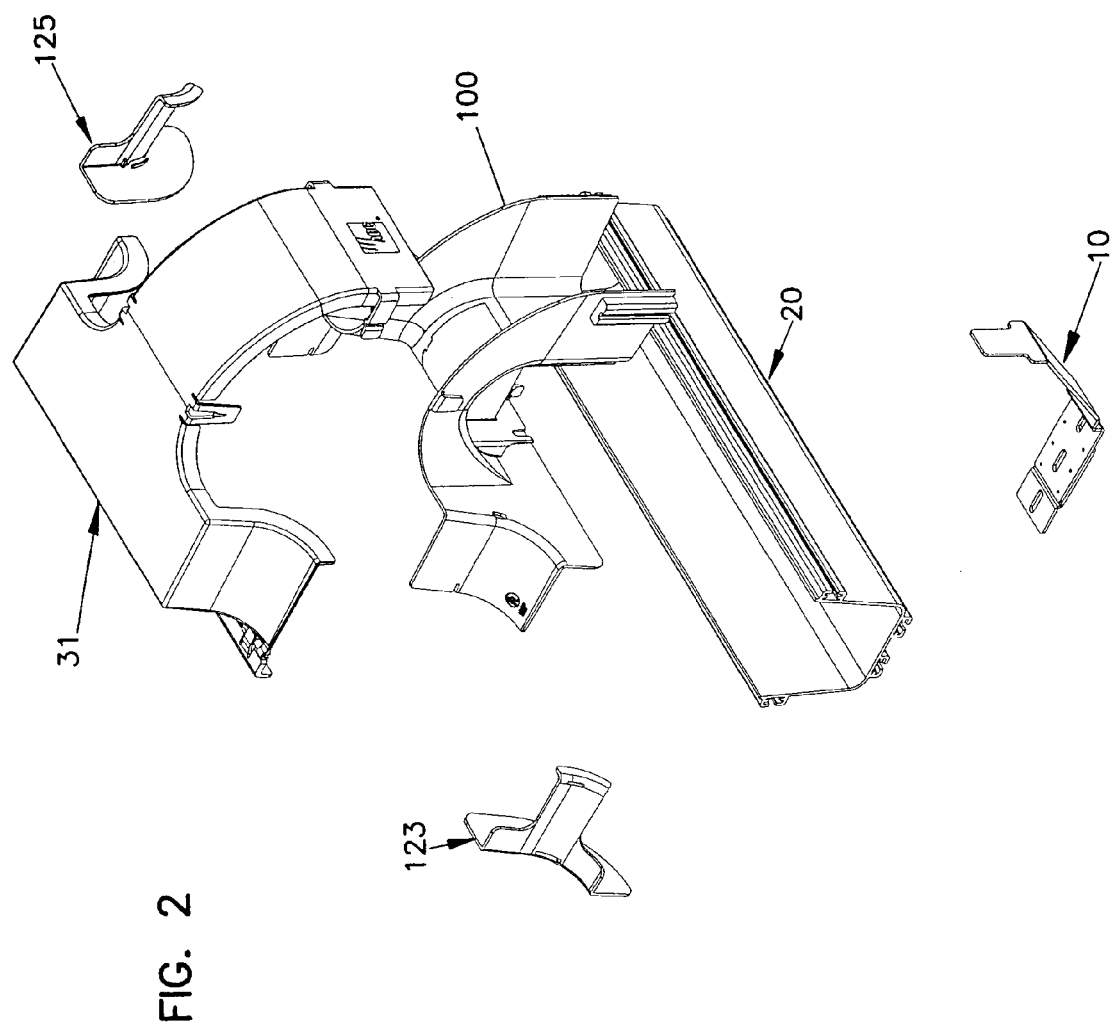
FIG. 2 shows a disassembled view of the exit trough assembly of FIG. 1.
Figure 3:
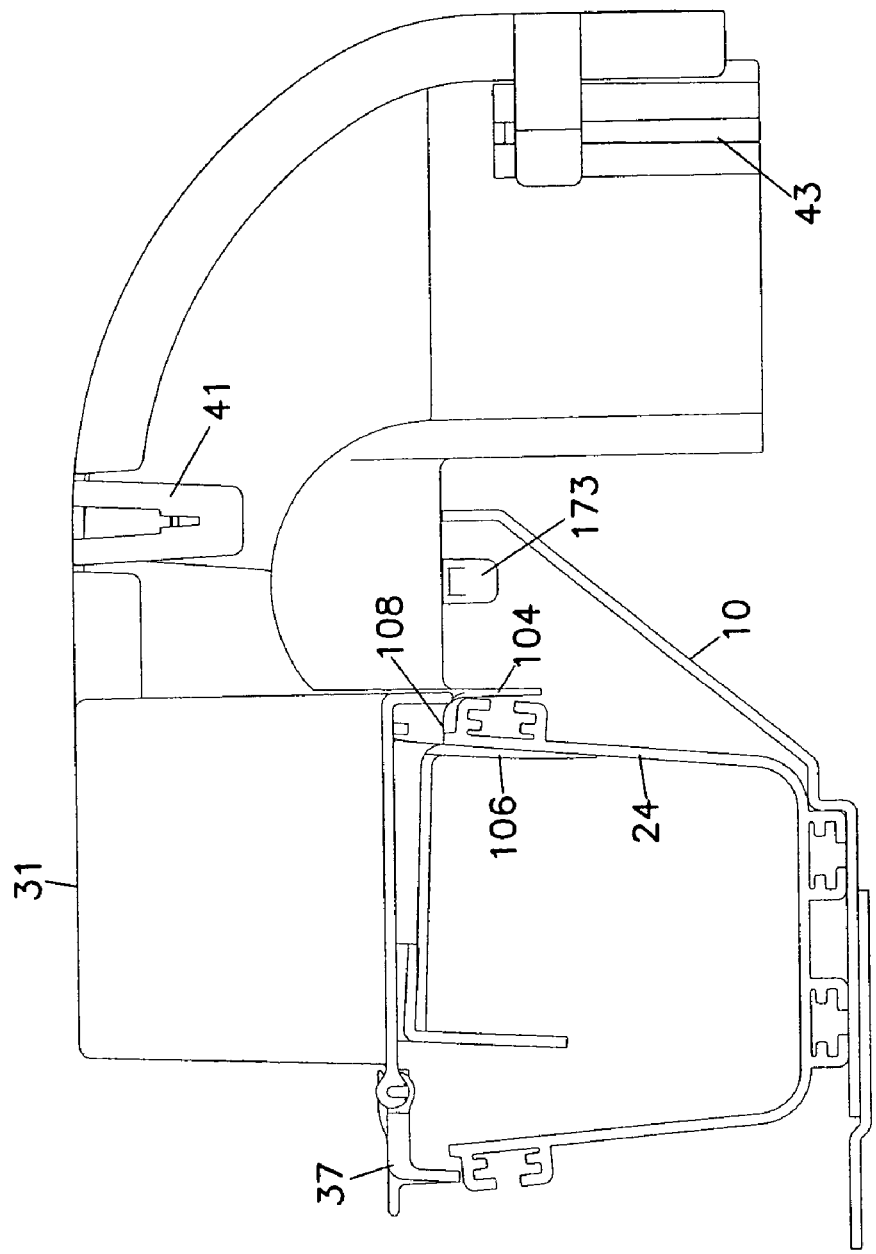
FIG. 3 is a side view of the exit trough assembly of FIG. 1.

Referring now to FIGS. 1-3, a first embodiment of an exit trough 100 is shown mounted to a lateral trough section 20. Lateral trough section 20 defines a cable pathway 22 for routing optical fiber cables between locations. Lateral trough section 20 and exit trough 100 can be part of a cable routing system typically within a structure, such as a building having optical fiber signal transmitting equipment. Lateral trough section 20 typically is suspended from a ceiling structure by any suitable means (not shown). U.S. Pat. Nos. 5,067,678 and 5,316,243 disclose various cable routing systems, including lateral trough sections like lateral trough section 20 illustrated in FIGS. 1-3. Exit trough 100 is not only usable with lateral trough section 20 shown in FIGS. 1-3, but also with other cable routing systems disclosed in U.S. Pat. Nos. 5,067,678 and 5,316,243, the disclosures of which are hereby incorporated by reference, and other cable routing systems. Exit trough 100 is an improvement over the exit troughs shown and described in U.S. Pat. No. 5,937,131, the disclosure of which is hereby incorporated by reference.

Generally, lateral trough section 20 includes first and second upstanding sides 24, 26, and a bottom 28 extending therebetween and defining cable pathway 22. Side 24 includes a top edge 30. Opposite side 26 also includes similar top edge 32. Lateral trough section 20 includes a plurality of attachment members 34 on an outside portion for use in attaching lateral trough sections 20 together end to end, or adding other system hardware.

As will be described below, exit trough 100 mounts to lateral trough section 20 adjacent to top edge 30 of side 24. Exit trough 100 creates a cable exit pathway from lateral trough section 20. Preferably, exit trough 100 mounts to lateral trough section 20 through attachment member 34, such as with a fastener.

Exit trough 100 includes a bracket portion 102 including an outer projecting member 104, an inner projecting member 106, and a connecting member 108. Bracket portion 102 generally defines a U-shape for receipt of a portion of side 24 such that top edge 30 is positioned adjacent to connecting member 108. Exit trough 100 conveniently and securely mounts to lateral trough section 20 via one or more fasteners positioned through outer projecting member 104 and engaged with attachment member 34 of lateral trough section 20. The exit trough 100 may also include a support arm 10 extending from the bottom side of the lateral trough section 20 to a point beneath the exit trough 100.

Figure 4:
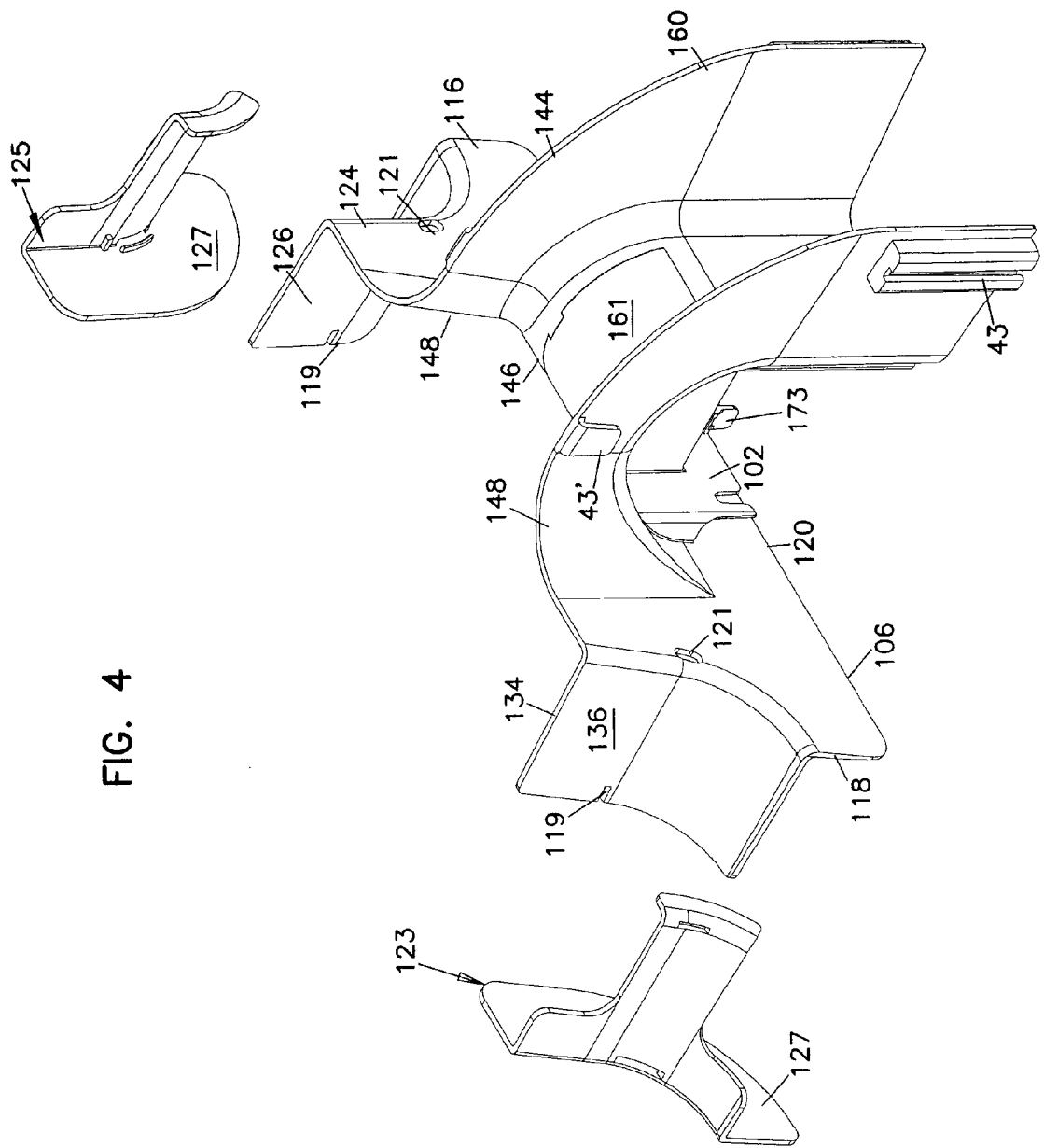
FIG. 4 is a perspective view of an exit trough according to the present invention with two flanges shown removed from the trough.
Figure 4A:
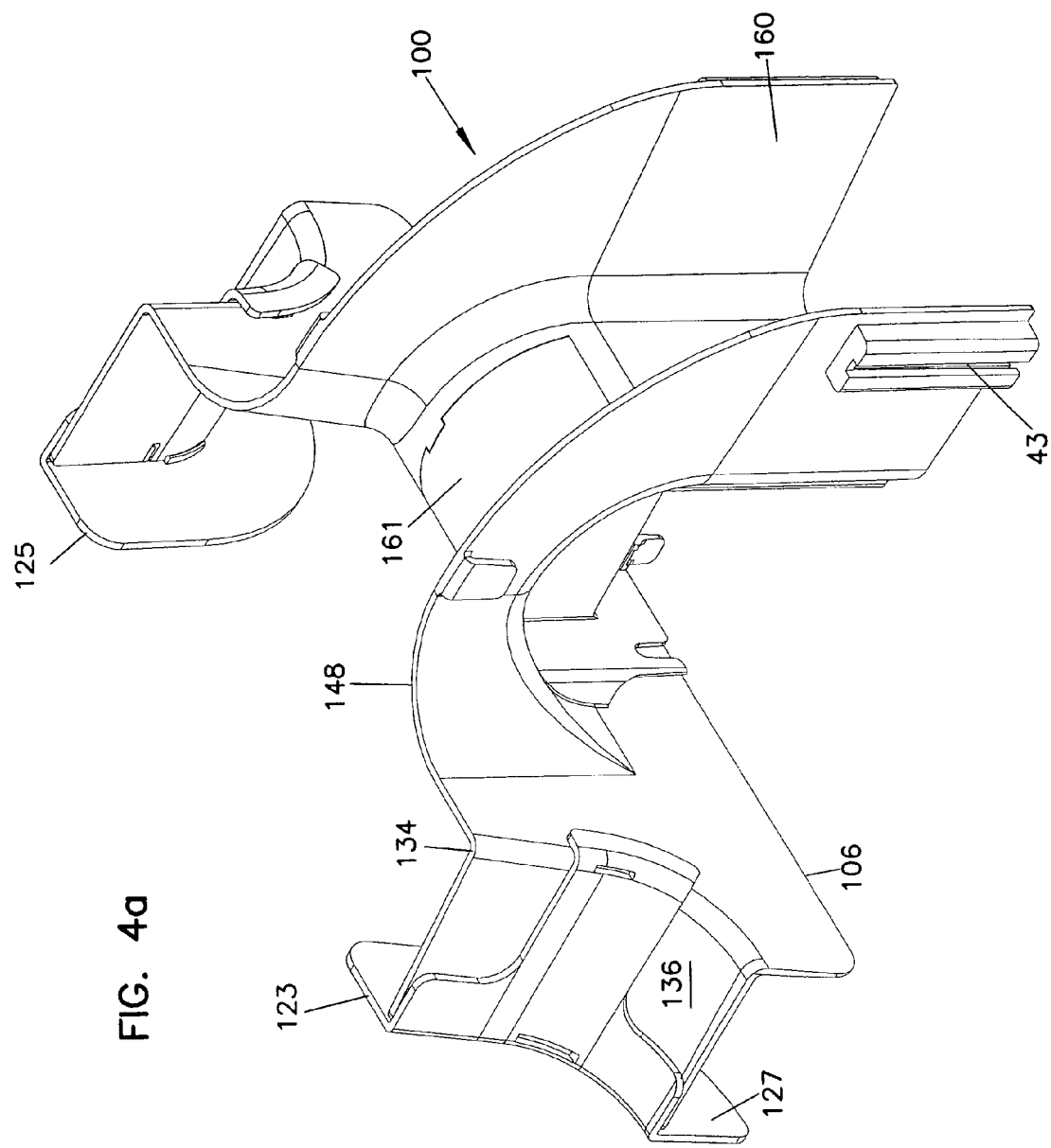
FIG. 4a is a perspective view of the exit trough of FIG. 4 showing both flanges attached to the exit trough.
Figure 15:
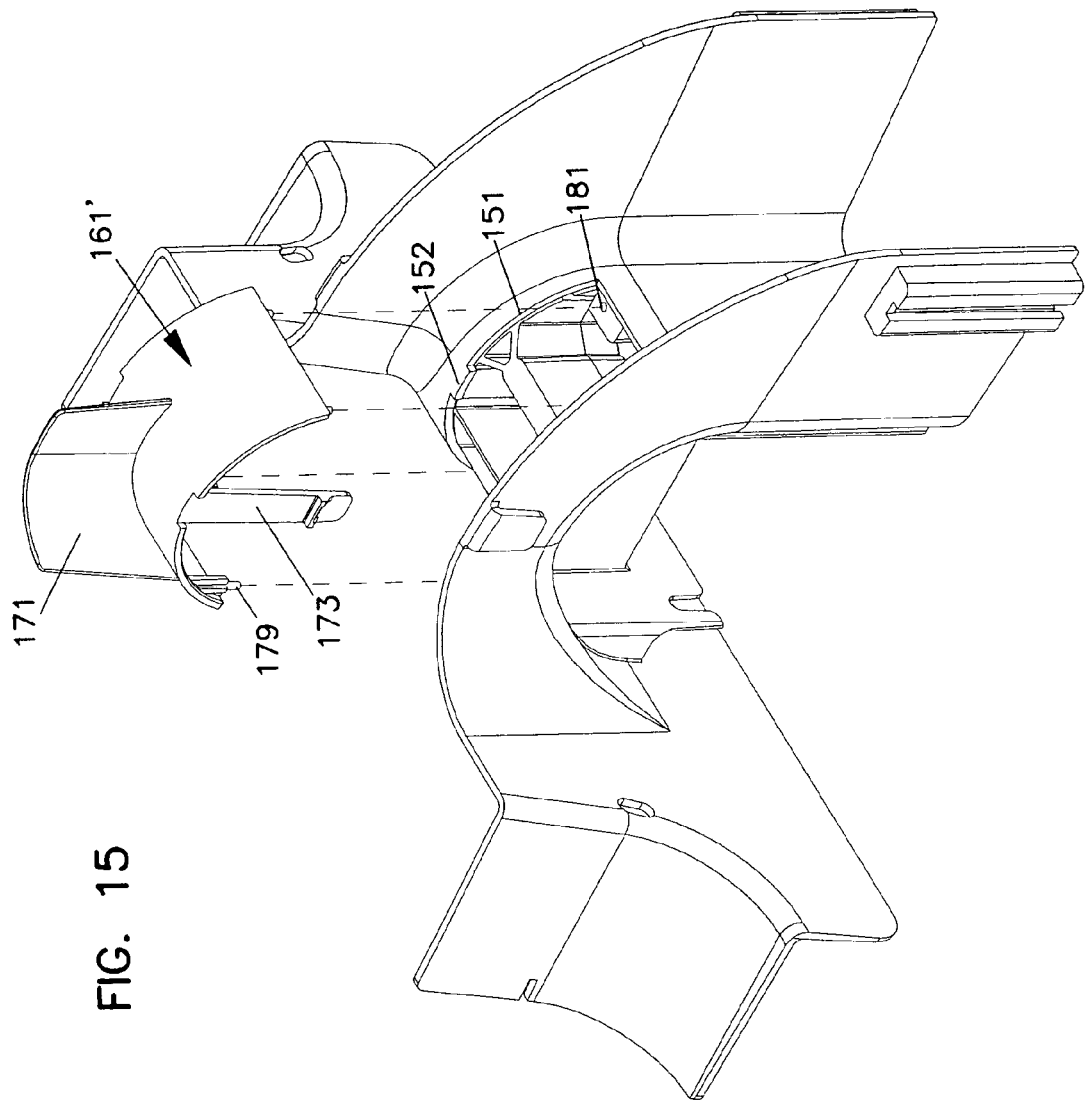
FIG. 15 is a perspective view of an exit trough according to the present invention and showing a removed modular insert piece with guidewall that curves in a first direction as it leads toward the downspout.
Figure 18:
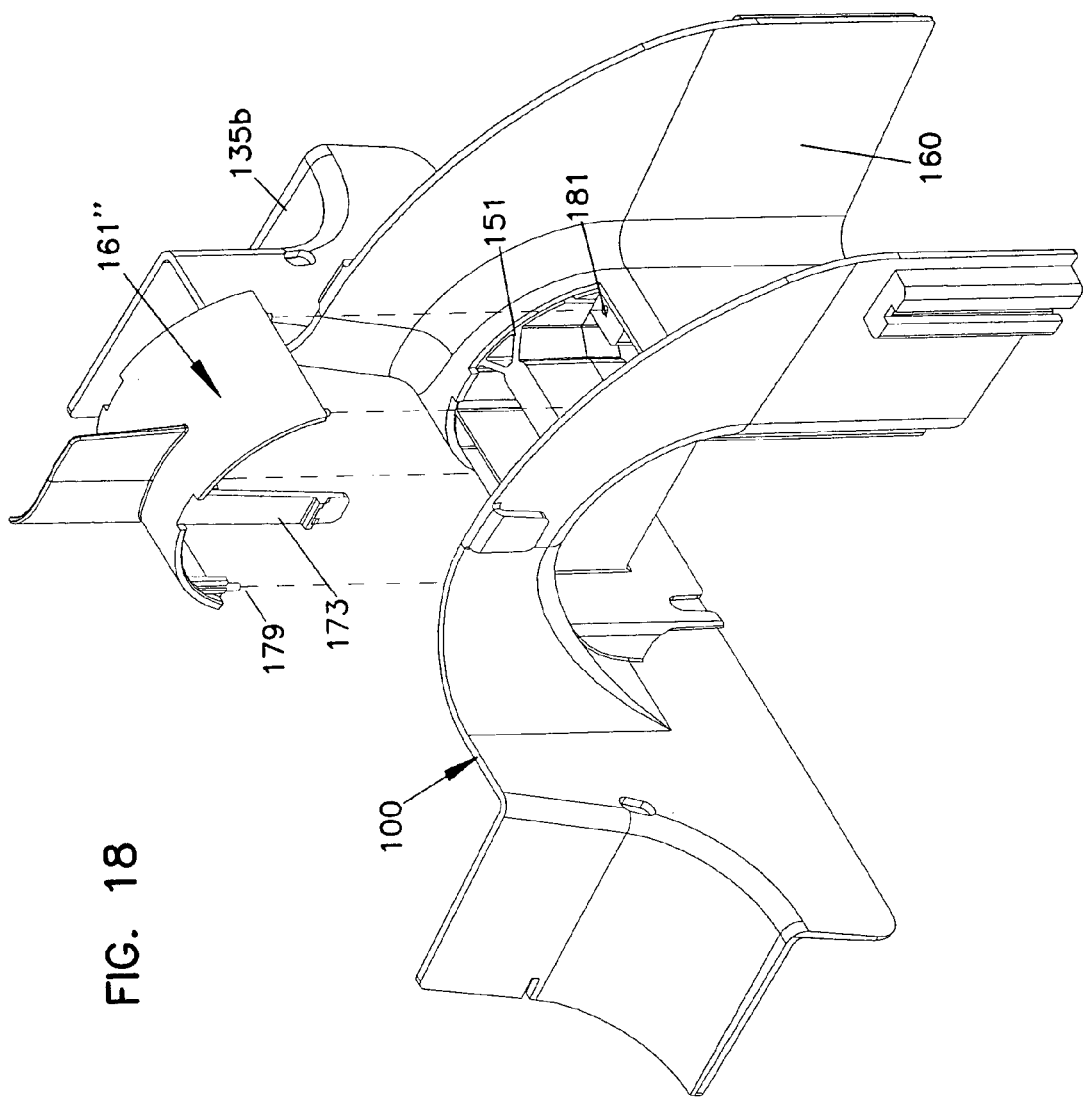
FIG. 18 is a perspective view of an exit trough according to the present invention and showing a removed modular insert piece with guidewall that curves in a second direction as it leads toward the downspout.
Figure 21:
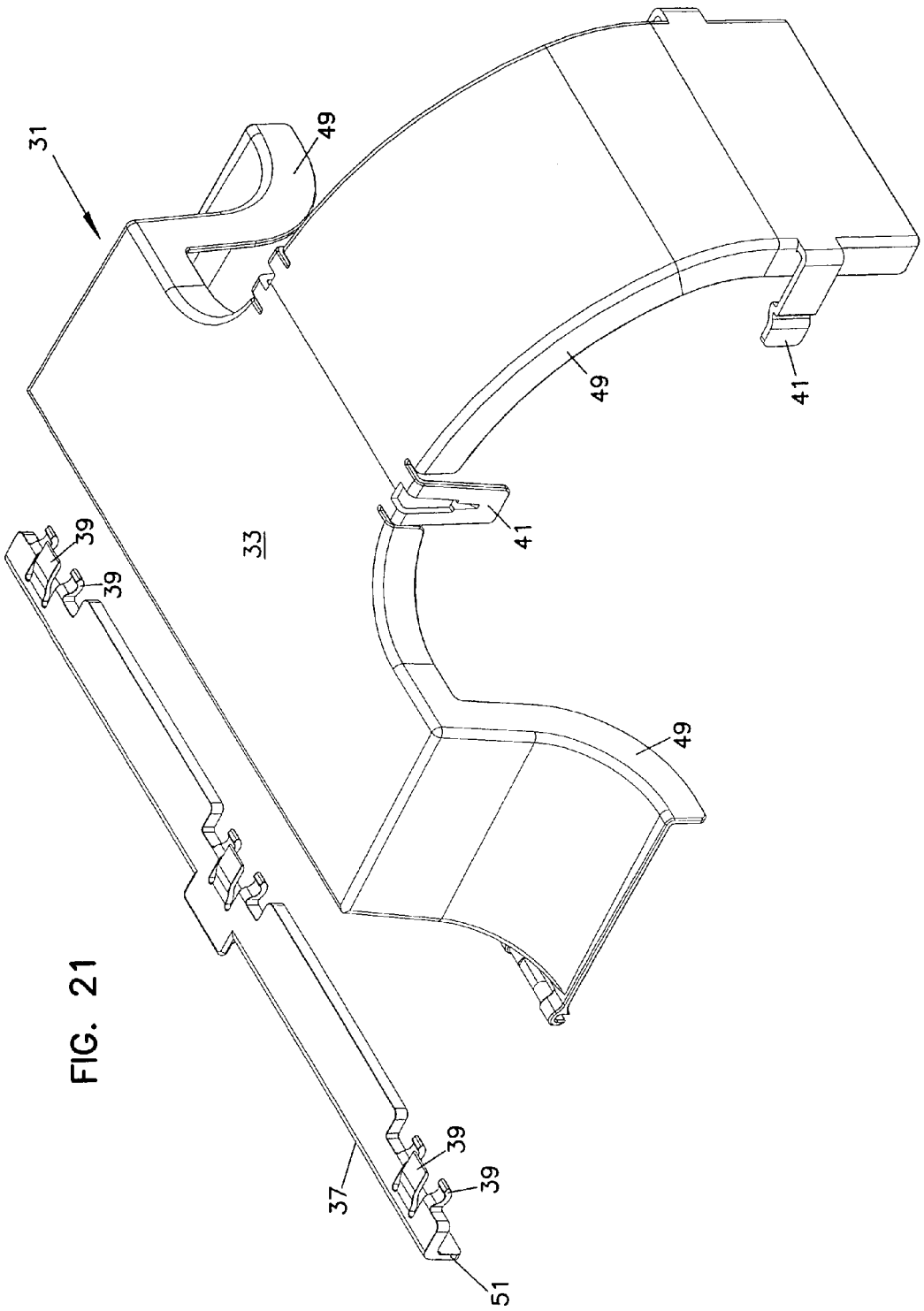
FIG. 21 is a disassembled perspective view of an exit cover according to the present invention.
Figure 22:
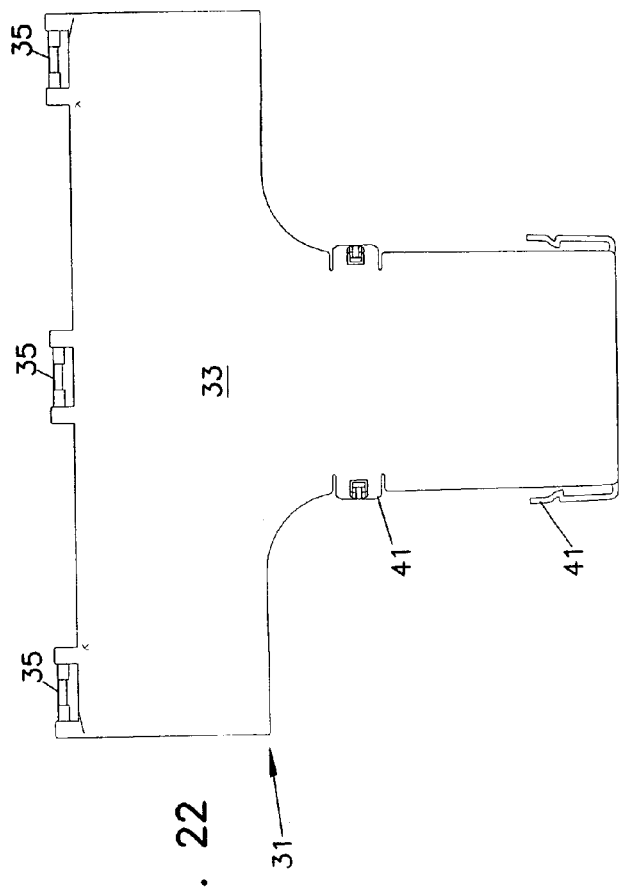
FIG. 22 is a top view of a cover plate according to the present invention.
Figure 23:
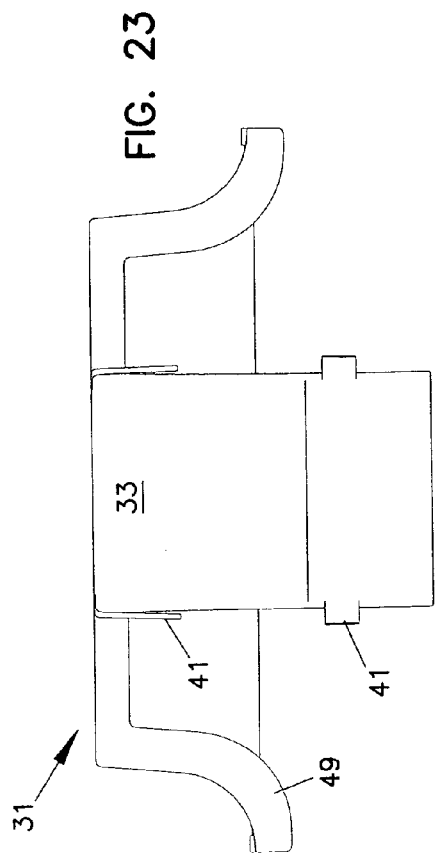
FIG. 23 is a front view of the cover plate of FIG. 22.
Figure 24:
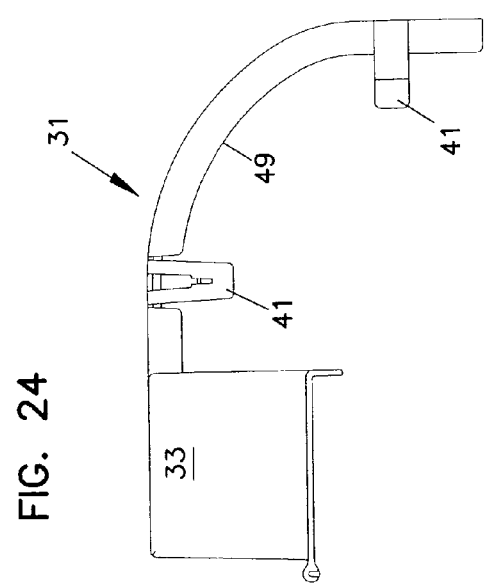
FIG. 24 is a side view of the cover plate of FIG. 22.

For protection of the optical fiber cables, inner projecting member 106 of bracket portion 102 is tapered. As shown in FIG. 4, bracket portion 102 generally extends from a first end 116 to a second end 118. A middle 120 is positioned between the first and second ends 116, 118. At first and second ends 116, 118, two cable lead-ins 124, 134 are provided. First lead-in 124 includes an upper surface portion 126 having an upwardly curved shape. Second lead-in 134 at an opposite end of bracket portion 102 faces in an opposite direction to first lead-in 124. Second lead-in 134 includes a similarly configured upwardly curved surface 136.

The two cable lead-ins 124 and 134 each define a slot 119 and hole 121 for receiving snap-mounted removable flanges 123 and 125. Flanges 123 and 125 each include a downwardly depending surface 127 which, when flanges 123 and 125 are snap-mounted to the lead-ins 124 and 134, defame cable pathways between the flanges 123 and 125 and the inner projecting member 106 of the bracket portion 102 to assist with cable management. Flanges 123 and 125 are optional, and provide a downwardly depending flange structure to assist with cable management and retention of the cable when desired. Flanges 123 and 125 include posts or tabs 122 which are received by the slot 119 and hole 121 of the cable lead-ins for snap-mounting of the flanges 123 and 125. The flanges 123 and 125 may also include an alignment rail 122' to assist in mounting the flange to the exit trough 100.

Exit trough 100 includes an exit trough portion 144 extending from bracket portion 102 at middle 120 away from lateral trough section 20. Exit trough portion 144 includes a bottom trough surface 146 and upstanding sides 148 on opposite sides of bottom trough surface 146. Generally bottom trough surface 146 extends upwardly and away from top edge 30 of lateral trough section 20, and includes a convex shape. Upstanding sides 148 extend from each respective lead-in 124, 134, and also define convex shapes. Exit trough portion 144 defines a cable pathway linked to cable pathway 22 of lateral trough section 20 via cable pathways of the lead-ins 124, 134.

In exit trough 100, exit trough portion 144 links lateral trough section 20 to a downspout 160. Downspout 160 generally provides a cable pathway for cable exiting in a downward direction relative to lateral trough section 20.

Significantly, the bottom trough surface 146 may define an insert aperture 151. The insert aperture is configured to receive a removable modular insert piece 161. The insert aperture 151 may receive modular inserts each having different cable management components. For instance, as seen in FIGS. 4, 4a and 6-12, an insert piece 161 may simply be flat, having no cable management component. Alternatively, the insert piece (as seen in FIGS. 15-20) may have an upstanding guidewall 171 for arranging cables as they pass from the lateral trough to the exit trough. The guidewall 171 may be curved so as to manage and protect the cable being guided. The guidewall 171 helps keep the cables from bunching up, such as may occur as greater and greater numbers of cables exit the trough 20. It may be advantageous in some situations for the guidewall to curve in a first direction from end 135a of the exit trough as it leads toward the downspout, and in other situations it may be advantageous for the guidewall to curve in an opposite direction from opposite end 135b toward downspout 160. Therefore, an insert piece may be configured to have a guidewall 171 that curves from end 135a toward downspout 160 (shown in FIGS. 15-17 as insert 161'), or alternatively from end 135b (shown in FIGS. 18-20 as insert 161") With an exit trough having an insert aperture 151, the exit trough may be assembled quickly and easily with the desired configuration. Further, the exit rough can be quickly and easily modified to meet changing needs.

Referring now to FIGS. 8-12, modular insert piece 161 includes a curved major surface 163 having a first convex side 165 and a second concave side 167. The major surface 163 has edges 169. The insert piece 161 includes guide tabs 173 extending from two edges of the major surface 163 on the concave side 167 of the major surface. The guide tabs 173 may each include a detent ridge 175 configured to engage a retaining wall 177 of the cable exit trough. Notches 174 mate with protrusions 152 on the cable exit trough. The modular insert piece 161 may also include a plurality of alignment pins 179 protruding from the concave side 167 of the major surface 163. The alignment pins 179 are spaced to be received by alignment holes 181 in the cable exit trough seen in FIGS. 8, 13, 15 and 18. The guide tabs 173 protrude below exit trough 100, to provide structure to release insert piece 161 so the insert piece can be changed as desired.

As shown in FIGS. 17 and 20, bottom trough surface 146 may include an upstanding guidewall 171 dividing the cable pathway of the exit trough portion 144 for improving cable management. The guidewall 171 preferably is curved to prevent damage to the cable. The guidewall may be incorporated into an insert piece or may be formed directly on the bottom trough surface 146.

With exit trough 100 mounted to lateral trough section 20, cable extending generally horizontally to the ground through lateral trough section 20 is allowed to route upwardly and away from lateral trough section 20, and then to route downwardly through downspout 160 for connection to optical transmission equipment, or other uses. Downspout 160 is connectable via any suitable means to other cable routing components, such as vertical troughs or conduit, as desired. The various curves provided with exit trough 100 help protect the optical fiber cables from being bent beyond a minimum radius of curvature.

The disclosed exit trough 100 allows for exit pathways from the lateral trough section 20 without modification to the lateral trough section 20. This is useful during initial system setup, and also during modifications of the system at later dates. Exit trough 100 can be added at any time quickly and easily. Cable damage is avoided since any cables in lateral trough section 20 are not disturbed and do not have to be moved when exit troughs 100 are added. Also, fasteners are all that is needed to mount the preferred bracket portion 102 of the exit trough 100 to the lateral trough section 20. In addition to the downspout 160 other directional components are possible from exit trough portions 144 of exit trough 100 such as horizontal portions which lead horizontally away from the lateral trough instead of vertically.

The preferred embodiments of exit trough 100 also include an exit cover 31. The cover 31 prevents dust and other foreign material from falling into or collecting inside the exit trough and lateral trough while allowing easy access to the troughs. As shown in FIGS. 21-26, the exit cover 31 includes a cover plate 33. The cover plate 33 is sized and shaped to cover the cable pathways of the lead-ins 124 and 134 as well as the cable pathway of the exit trough portion 144 and the lateral trough 20. The cover plate 33 is configured with hinge posts 35. The cover 31 includes a pivoting door or pivot plate 37. The pivot plate 37 defines hinge tabs 39 for rotatably receiving the hinge posts 35 of the cover plate 33. Alternatively, the cover plate 33 may be configured with the hinge tabs 39 and the pivot plate 37 may be configured with the hinge posts 35 to be received by the hinge tabs 39 of the cover plate 33. The hinge posts 35 and hinge tabs 39 define a hinge axis which is parallel to the lateral trough section 20.

Figure 29:
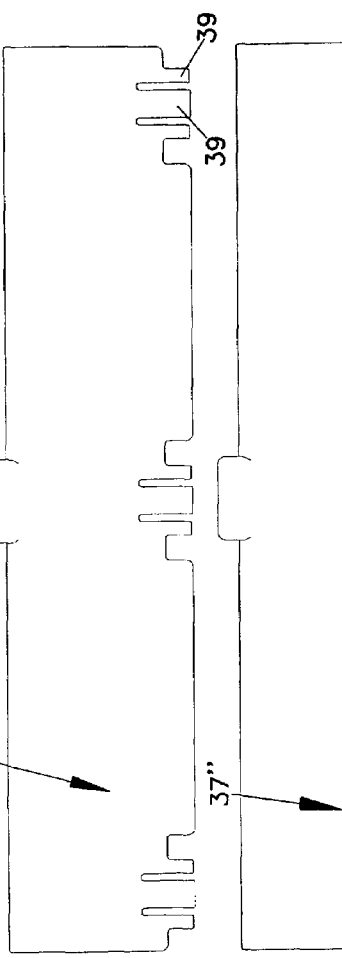
FIG. 29 is a top view of the pivot plate of FIG. 27.
Figure 30:
FIG. 30 is a top view of an alternative embodiment of a pivot plate according to the present invention.
Figure 31:
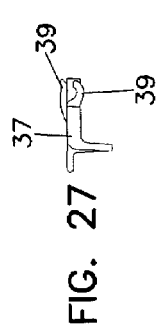
FIG. 31 is a top view of another alternative embodiment of a pivot plate according to the present invention.

The cover plate 33 includes retention tabs or clips 41 which in combination with detent grooves 43 or clips 43' in the exit trough secure the exit cover 31 to the exit trough 100. The cover plate 33 includes downward outer lips 49, and the pivot plate includes a downward outer lip 51 to surround and protect lateral trough section 20 and exit trough 100. The cover plate 33 is roughly t-shaped with the post of the "T" curving downward to cover the downspout 160. Cover plate 33 includes sidewalls 33' to cover the lead-ins of the exit trough 100. In addition, as shown in FIGS. 29-31, the pivot plate 37 may be made in varying sizes for covering larger or smaller lateral troughs.

Figure 25:
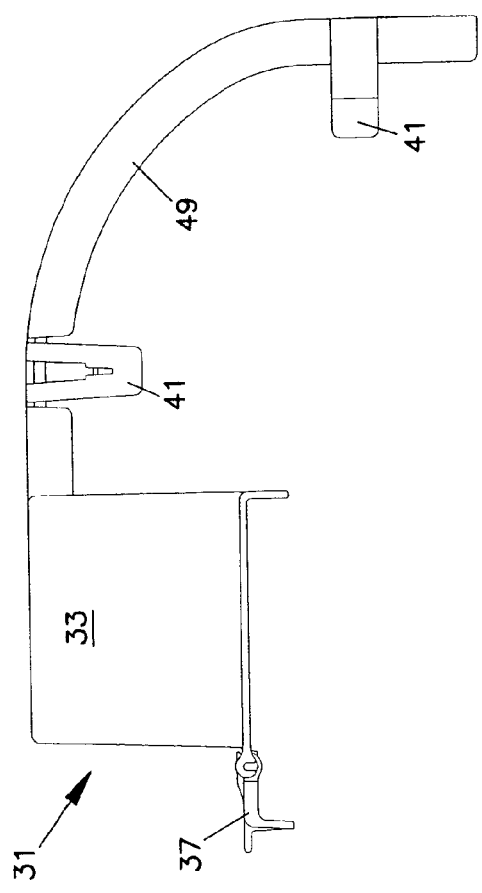
FIG. 25 is a side view of an exit cover according to the present invention showing the pivot plate in a closed position.
Figure 26:
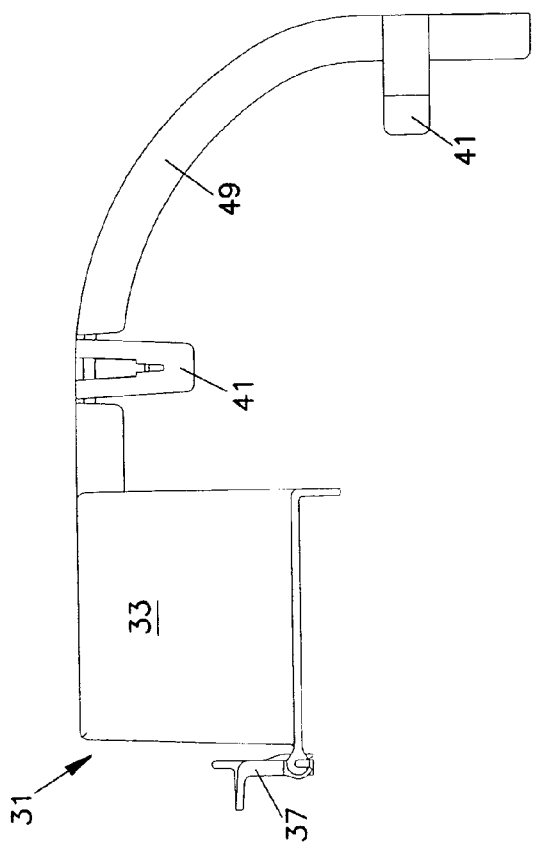
FIG. 26 is a side view of the exit cover of FIG. 25 showing the pivot plate in an open position.
Figure 27:
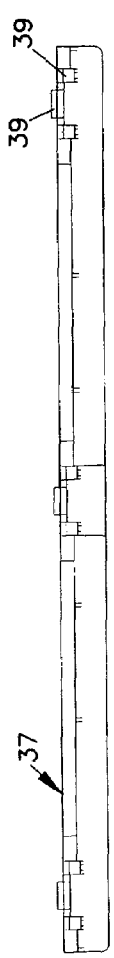
FIG. 27 is a side view of a pivot plate according to the present invention.
Figure 28:
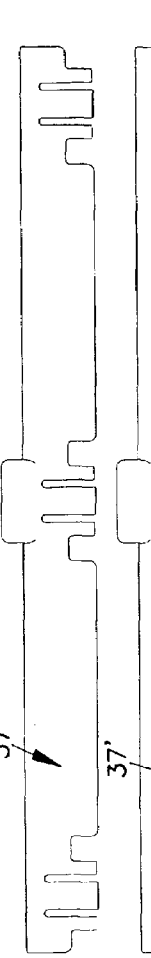
FIG. 28 is a front view of the pivot plate of FIG. 27.

The pivot plate 37 may be pivoted relative to the cover plate 33 between an open position as shown in FIG. 26 and a closed position as shown in FIG. 25. When the pivot plate 37 is in the open position relative to the cover plate 33, an access port is created between the upstanding side 26 of the lateral trough section and the cover plate 33, thereby allowing insertion or removal of cables from the trough. In this way, cables may be inserted or removed to or from the lateral trough without the cumbersome step of completely removing the entire cover 31 from the exit trough 100. This often occurs when a new downspout and exit trough is added for new cables. The upstream exit troughs can each be covered with a cover 31. Only the pivot plates 37 of the covers 31 need to be moved to drop in new cables.

Having described the present invention in its preferred embodiment, modifications and equivalents may occur to one skilled in the art. It is intended that such modifications and equivalents shall be included within the scope of the claims which are appended hereto.

What is claimed is:

1. A cable routing system, comprising:
a) a lateral trough section including a bottom and two upstanding sides extending from the bottom to define a cable pathway;
b) a cable exit trough mounted to the lateral trough section, the cable exit trough defining an exit pathway for routing cables from the cable pathway of the lateral trough section to a location outside of the lateral trough section; and
c) a removable cover including first and second cover portions interconnected to one another by a hinge;
d) wherein the first cover portion includes attachments that attach the cover to the cable exit trough, the first cover portion covering the exit pathway of the cable exit trough; and
e) wherein the second cover portion covers the cable pathway of the lateral trough section, the second cover portion pivoting relative to the first cover portion when the cover is attached to the cable exit trough, the pivoting second cover portion providing access to the cable pathway of the lateral trough section without detaching the cover from the cable exit trough and without uncovering the exit pathway.

2. The cable routing system of claim 1, wherein the hinge of the cover includes hinge posts provided on the first cover portion and hinge tabs provided on the second cover portion.

3. The cable routing system of claim 1, wherein the hinge of the cover defines a hinge axis that is parallel to the lateral trough section.

4. The cable routing system of claim 1, wherein the first cover portion is generally T-shaped.

5. The cable routing system of claim 1, wherein the attachments of the first cover portion include clips that attach to detent structure provided on the cable exit trough.

6. The cable routing system of claim 1, wherein the cable pathway of the lateral trough section has a width, the first cover portion covering part of the width of the cable pathway, the second cover portion covering the remaining width of the cable pathway.

7. The cable routing system of claim 1, wherein the cable exit trough includes a curved bottom trough wall, the first portion of the cover having a corresponding curved construction.

8. A cable routing system, comprising:
   a) a lateral trough section having a first end and a second opposite end, the lateral trough section including a bottom and two upstanding sides extending from the bottom to define a cable pathway;
   b) a cable exit trough mounted between the first and second ends of the lateral trough section, the cable exit trough defining an exit pathway extending generally perpendicular to the cable pathway of the lateral trough section;
   c) a removable exit pathway cover attached to the cable exit trough;
   d) a pivoting door that covers at least a portion of the cable pathway of the lateral trough section, the pivoting door permitting insertion and removal of cables from the lateral trough section, the pivoting door being attached to the exit pathway cover by a hinge; and
   e) wherein the pivoting door pivots relative to the exit pathway cover when the cover is attached to the cable exit trough, the pivoting door permitting the insertion and removal of cables from the lateral trough section without detaching the exit pathway cover from the cable exit trough and without uncovering the exit pathway.

9. The cable routing system of claim 8, wherein the exit pathway cover includes posts, and wherein the pivoting door includes tabs, the posts and tabs defining the hinge that attaches the pivoting door to the exit pathway cover.

10. The cable routing system of claim 8, wherein the hinge that attaches the pivoting door to the exit pathway cover is parallel to the lateral trough section.

11. The cable routing system of claim 8, wherein the exit pathway cover is generally T-shaped.

12. The cable routing system of claim 8, wherein the exit pathway cover includes clips that attach to detent structure provided on the cable exit trough.

13. The cable routing system of claim 8, wherein the cable pathway of the lateral trough section has a width, the exit pathway cover covering part of the width of the cable pathway, the pivoting door covering the remaining width of the cable pathway.

14. The cable routing system of claim 8, wherein the cable exit trough includes a curved bottom trough wall, the exit pathway cover having a corresponding curved construction.

15. A cable routing system, comprising:
   a) a lateral trough section including a bottom and two upstanding sides extending from the bottom to define a cable pathway;
   b) a cable exit trough mounted to the lateral trough section, the cable exit trough defining an exit pathway for routing cables from the cable pathway of the lateral trough section to a location outside of the lateral trough section; and
   c) a cover including first and second cover portions interconnected to one another by a hinge;
   d) wherein the first cover portion includes attachments that attach the cover to the cable exit trough, the first cover portion covering the exit pathway of the cable exit trough;
   e) wherein the second cover portion covers the cable pathway of the lateral trough section, the second cover portion pivoting relative to the first cover portion when the cover is attached to the cable exit trough, the pivoting second cover portion providing access to the cable pathway of the lateral trough section without detaching the cover from the cable exit trough; and
   f) wherein the cable pathway of the lateral trough section has a width, the first cover portion covering part of the width of the cable pathway, the second cover portion covering the remaining width of the cable pathway.

16. The cable routing system of claim 15, wherein the hinge of the cover includes hinge posts provided on the first cover portion and hinge tabs provided on the second cover portion.

17. The cable routing system of claim 15, wherein the hinge of the cover defines a hinge axis that is parallel to the lateral trough section.

18. The cable routing system of claim 15, wherein the first cover portion is generally T-shaped.

19. The cable routing system of claim 15, wherein the attachments of the first cover portion include clips that attach to detent structure provided on the cable exit trough.

20. The cable routing system of claim 15, wherein the cable exit trough includes a curved bottom trough wall, the first portion of the cover having a corresponding curved construction.

21. A cable routing system, comprising:
   a) a lateral trough section having a first end and a second opposite end, the lateral trough section including a bottom and two upstanding sides extending from the bottom to define a cable pathway;
   b) a cable exit trough mounted between the first and second ends of the lateral trough section, the cable exit trough defining an exit pathway extending generally perpendicular to the cable pathway of the lateral trough section;
   c) an exit pathway cover attached to the cable exit trough; and
   d) a pivoting door that covers at least a portion of the cable pathway of the lateral trough section, the pivoting door permitting insertion and removal of cables from the lateral trough section, the pivoting door being attached to the exit pathway cover by a hinge;
   e) wherein the pivoting door pivots relative to the exit pathway cover when the cover is attached to the cable exit trough, the pivoting door permitting the insertion and removal of cables from the lateral trough section without detaching the exit pathway cover from the cable exit trough; and
   f) wherein the cable pathway of the lateral trough section has a width, the exit pathway cover covering part of the width of the cable pathway, the pivoting door covering the remaining width of the cable pathway.

22. The cable routing system of claim 21, wherein the exit pathway cover includes posts, and wherein the pivoting door includes tabs, the posts and tabs defining the hinge that attaches the pivoting door to the exit pathway cover.

23. The cable routing system of claim 21, wherein the hinge that attaches the pivoting door to the exit pathway cover is parallel to the lateral trough section.

24. The cable routing system of claim 21, wherein the exit pathway cover is generally T-shaped.

25. The cable routing system of claim 21, wherein the exit pathway cover includes clips that attach to detent structure provided on the cable exit trough.

26. The cable routing system of claim 21, wherein the cable exit trough includes a curved bottom trough wall, the exit pathway cover having a corresponding curved construction.

* * * * *